United States Patent

Dolby

[15] 3,665,345

[45] May 23, 1972

[54] COMPRESSORS AND EXPANDERS FOR NOISE REDUCTION SYSTEMS

[72] Inventor: Ray Milton Dolby, London, England

[73] Assignee: Dolby Laboratories Inc., New York, N.Y.

[22] Filed: July 15, 1970

[21] Appl. No.: 55,201

[30] Foreign Application Priority Data

July 21, 1969 Great Britain......................36,466/69

[52] U.S. Cl.................................333/14, 307/237, 328/167, 330/149, 330/151, 333/17

[51] Int. Cl......................H04b 1/64, H03h 7/10, H03g 5/16

[58] Field of Search........................333/14, 17, 70; 328/167; 179/1 D, 1 P; 330/149, 151

[56] References Cited

UNITED STATES PATENTS

| | | | |
|---|---|---|---|
| 2,606,971 | 8/1952 | Scott | 333/70 X |
| 2,817,715 | 12/1957 | Blake | 333/14 X |
| 3,112,452 | 11/1963 | Kirkpatrick | 328/167 |
| 3,229,038 | 1/1966 | Richter | 333/14 X |
| 3,278,866 | 10/1966 | Bose | 333/17 |
| 3,297,882 | 1/1967 | Broadhead, Jr. | 333/14 X |
| 3,304,369 | 2/1967 | Dreyfus | 333/14 X |

OTHER PUBLICATIONS

Goodell et al., Auditory Perception, Electronics, July 1946, Page 143

*Primary Examiner*—Paul L. Gensler
*Attorney*—Roberts, Cushman & Grover

[57] ABSTRACT

The invention concerns noise reduction systems and compressors and expanders therefor in which the overall characteristic is formed by combining the output of a further path additively or subtractively with the output of a main, straight-through path, the further path including a filter and limiter.

In this improvement the filter is essentially all-pass at low levels and only becomes high- pass or low-pass at higher levels. At low levels noise reduction is therefore wide-band.

Applicable to tape and disc audio noise reduction.

10 Claims, 9 Drawing Figures

Patented May 23, 1972

3,665,345

4 Sheets-Sheet 4

COMPRESSORS AND EXPANDERS FOR NOISE REDUCTION SYSTEMS

This invention relates to signal compressors, expanders and noise reduction systems such as are disclosed in the specifications of U.S. applications Ser. Nos. 569,615 (refiled as continuation application No. 880,481) and 789,703. The invention is applicable to both type I and type II devices as defined in the second of these applications.

The main characteristic of all the devices described in the above-mentioned specifications is that no attempt is made to establish the required compression or expansion law by operating upon the whole dynamic range of the signal. Rather a main, straight-through signal path is provided, through which signals, and in particular high-level signals, can pass undistorted. With these signals is combined the output of a further path, which can take its input either from the input to or the output from the device. This output, at low signal levels, either boosts or bucks the main signal to provide compression or expansion, respectively. However, the further path includes a limiter so that, at higher signal levels, the output of this path is negligible compared with the main signal, resulting in minimal boosting or bucking. In this way, a compression or expansion characteristic is derived with substantial avoidance of the severe problems inherent in previously known devices which operate on the whole signal in accordance with a non-linear law.

It is particularly important that compressors and expanders of the type described can be made truly complementary, so that a complete noise reduction or companding system, in which the signal is passed first through the compressor and subsequently through the expander, will not in itself introduce distortion.

In the specific examples given in both the above-mentioned specifications, and also that of application No. 867454 the further path is restricted to operation within a particular band forming part only of the overall signal band, since noise modulation effects preclude the use of simple wide-band noise reduction. A plurality of further paths have to be used to cover the whole audio band, for example.

The object of the present invention is to provide economical compressors and expanders which will provide wide-band noise reduction under quiescent, low-level conditions but which will be essentially high-pass or low-pass under limiting conditions. Thus, in an audio system for example, wherein the further path becomes high-pass under limiting conditions, the use of a compressor and expander will effect wide-band noise reduction so long as the signal is at a low level. As soon as an appreciable low to mid-frequency signal appears, however, the further path will become high-pass and noise reduction will take place only at the upper frequencies, so avoiding noise modulation problems.

According to the present invention there is provided a signal compressor or expander comprising a straight-through signal path and means for combining with the signals therein, so as either to boost or buck such signals, the output signal of a further path which takes its input either from the input to or the output from the compressor or expander and which includes means for limiting the amplitude of the said output signal and a variable cut-off filter for restricting signals passing through the further path, the filter being constructed to present substantially all-pass characteristics under low-level signal conditions and including a branch of variable impedance whose impedance is so responsive to the output level of the filter that, at higher signal levels, the filter assumes high-pass or low-pass or high-pass plus low-pass characteristics.

The invention will be described in more detail, by way of example, with reference to the accompanying drawings, in which.

Figure 3:
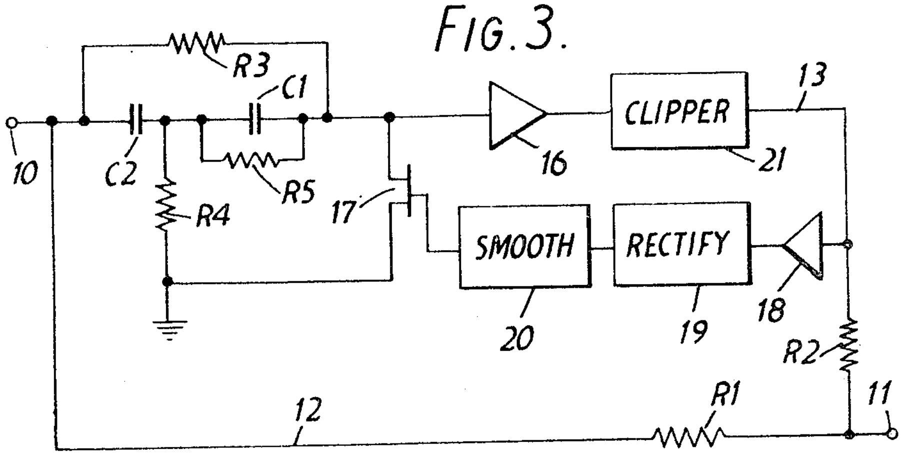
FIGS. 3 and 4 are circuit diagrams of improved embodiments particularly suitable for use with tape recorders where there is a substantial problem of high frequency noise (hiss) and a lesser problem of low frequency noise.
Figure 3A:
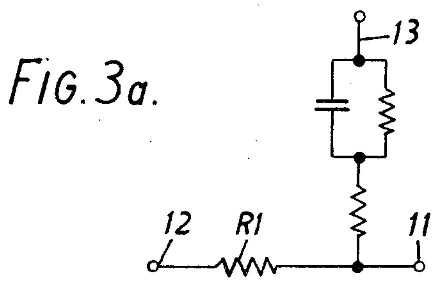
Figure 4:
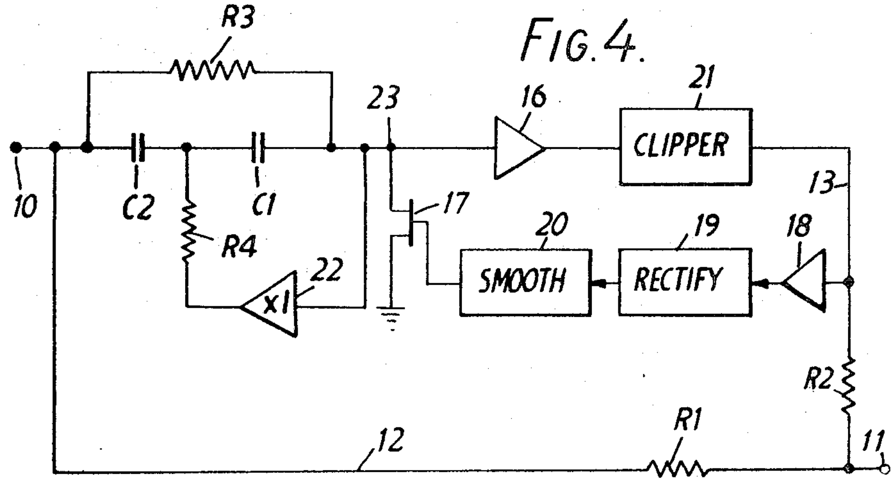
Figure 5:
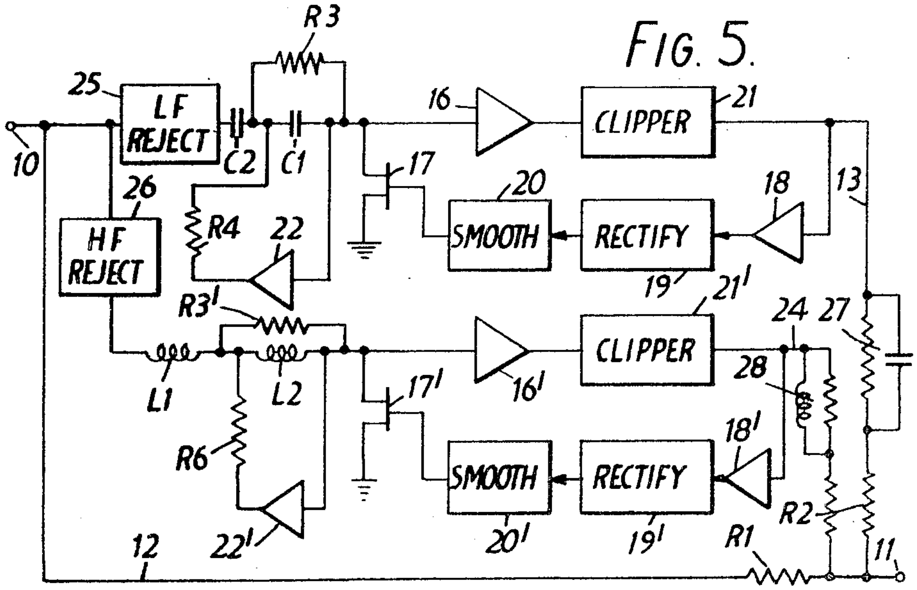
Figure 6:
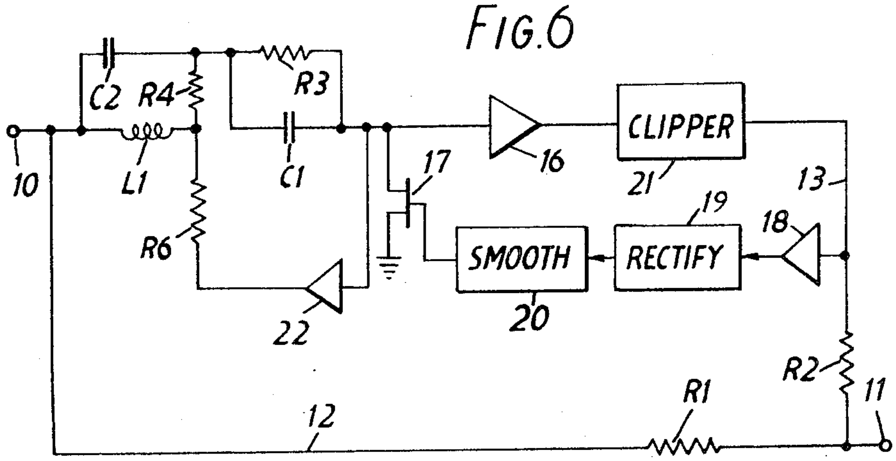
Figure 7:
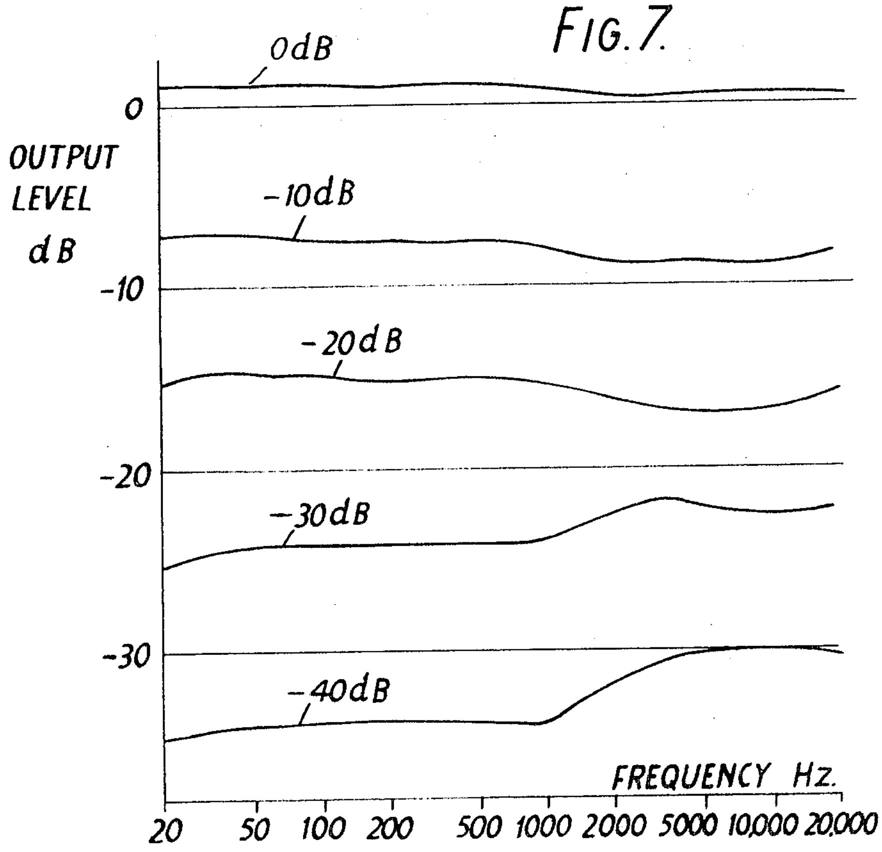
Figure 8:
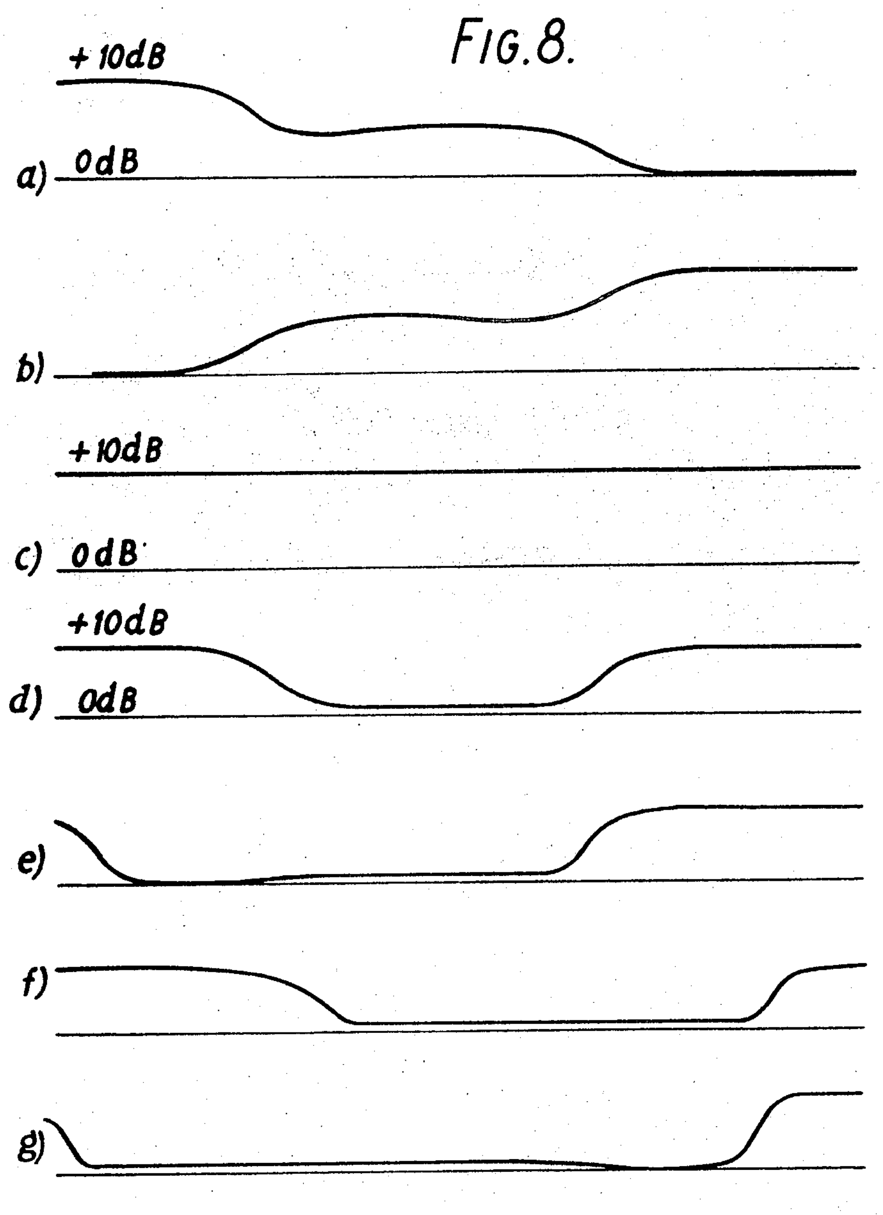

FIG. 3*a* shows a modification of FIG. 0:

FIGS. 5 and 6 show two ways in which the circuit of FIG. 4 can be developed to deal more efficiently with low frequency noise also, particularly for use in conjunction with disc recordings, and FIGS. 7 and 8 show some characteristic curves.

All the embodiments are type I compressors for simplicity but can all be altered to the configuration of a type I or II compressor or expander (without modifying the form of the further path) in accordance with the teaching of the specifications mentioned above. In each figure an input terminal 10 is connected to an output terminal 11 by way of a main path 12 and a further path 13, resistors R1 and R2 combining the contributions of the paths in the desired proportions.

Figure 1:
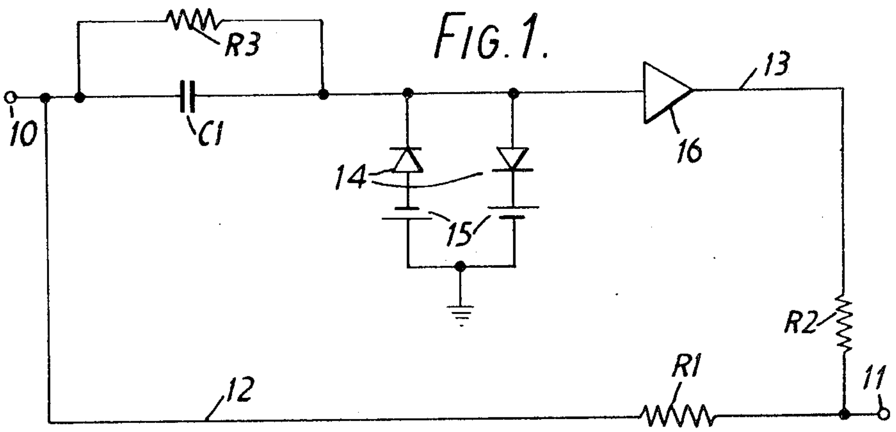
FIGS. 1 and 2 are circuit diagrams of two very simple embodiments of the invention.

In FIG. 1 the filter/limiter comprises a series capacitor C1 shunted by a resistor R3 followed by a parallel arm formed of two diodes 14 suitably biased (schematically in FIG. 1 by batteries 15), followed in turn by an amplifier 16. Under low-level conditions the signal is passed by the resistor R3 and amplified by the amplifier 16, thereby to boost substantially the output of the compressor.

When the signal level becomes sufficiently high to cause the diodes 14 to conduct, two effects occur. Firstly the input to and hence the output from the amplifier 16 is subject to limiting whereby the contribution of the further path falls relative to that of the main path. It is in this way, as explained in the aforementioned specifications, that a compression characteristic is created.

The second effect is that a high-pass CR filter is created by the capacitor C1 and the conductive diodes 14. The further path 13 is no longer therefore a wide-band path. It has high-pass characteristics and, by suitable proportioning of component values, it can be arranged that noise reduction continues to occur at high frequencies but with reduced noise modulation effects, because the further path is no longer wide-band.

Figure 2:
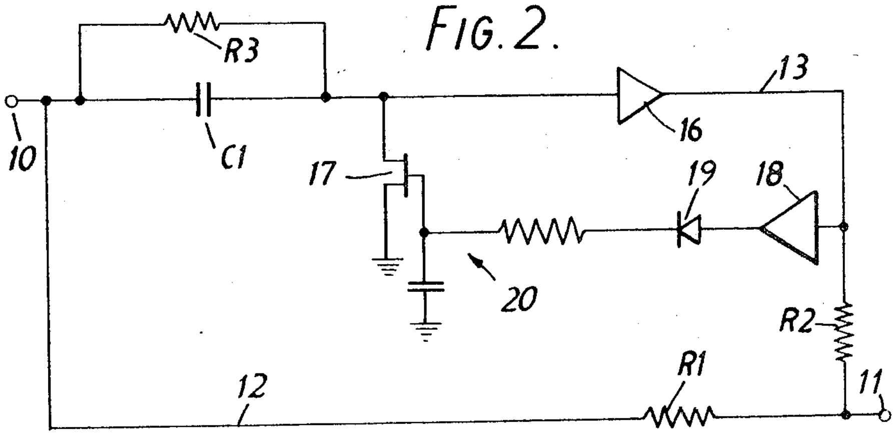

In FIG. 2 the diodes 14 are replaced by an FET 17 whose resistance is controlled by the signal in the further path. The said signal is amplified by an amplifier 18, rectified by a rectifier 19 (a full-wave or bridge rectifier can replace the single diode shown) and smoothed by a smoothing circuit 20.

The operation is similar to that of FIG. 1 in that, once the signal in the further path rises and the FET starts to conduct, a high-pass filter is created. In this instance, however, the limiting required to achieve an overall compression characteristic is provided by the filter whose cut-off frequency swings upwardly to exclude mid- and high-level signals in a manner already explained in the specifications mentioned above. The important thing to note, however, is that in FIG. 2 the filter does not really exist at low levels, i.e. it has a cut-off frequency of zero, low frequency and even DC signals being passed by the resistor R3.

The very simple filter circuits of FIGS. 1 and 2 do not have sufficient discrimination against medium and low frequencies under high level signal conditions, since the cut-off of the filter occurs at only 6 db per octave, and hence noise modulation effects are likely to arise with certain types of program material. The embodiments of FIGS. 3 and 4 achieve a sharper cut-off and yet still only require one active element in the filter.

In FIG. 3 the high-pass filter formed by C1 and the FET 17 is preceded by a fixed high-pass filter formed of C2 and R4. R3 is still connected directly between the input terminal 10 and FET 17 in order to preserve the all-pass characteristics under quiescent conditions. A resistor R5 is optional and may be connected in parallel with the FET 17 instead of in parallel with C1 as shown. If included, R5 will give reduced transmission of low frequencies in relation to high frequencies Thus, for example, it is possible to provide only 6 db of low and medium frequency noise reduction while obtaining 10 db at high frequencies. The decreased noise reduction at low frequencies is sufficient to be worthwhile, yet it is not so great as to cause possible problems with hum modulation. In FIG. 3 the amplifier 16 is followed by a clipper 21 for eliminating strong transients which pass through the preceding limiter (which is syllabic by virtue of the smoothing circuit 20).

The curves shown in FIG. 7 were obtained using a circuit as shown in FIG. 3. Output level is plotted against frequency for a plurality of different input levels, each curve being labelled with its input level. Levels are referenced to O VU (O volume units), which is the level at nominal maximum amplitude. At an output level of −40 db it can be seen that the further path 13 has introduced a 6 db boost at low and mid-frequencies; the boost rises to 10 db at higher frequencies. At −30 db the corresponding boosts are 6 db and 8 db. At −20 db there is about 4 to 5 db boost throughout the frequency range and at −10 db the boost has fallen to about 2 db. At 0 VU the boost is only about 1 db at low frequencies and less than ½ db at high frequencies.

A disadvantageous aspect of the performance shown in FIG. 7 is that the low and mid-frequency further path limiting action is not sufficient at high levels. The 1 db or so disparity level at high levels when the further path is switched on and off (noise reduction on-off) could cause level and standardization ambiguities. In addition, many of the low distortion and tracking advantages of the differential technique, in which the signals from a main path and a further path are combined, are dependent upon the use of low-level limiting thresholds and a strong limiting characteristic at high levels.

The weak limiting characteristic at low frequencies is mainly due to low gain of the control amplifier at low frequencies; in addition there is approximately a 6 db loss in the filter/limiter network at low frequencies, which further contributes to low loop-gain. A slight improvement (about 6 db in loop-gain) can be obtained by eliminating R5. Full transmission is maintained at low frequencies, which improves the loop-gain situation. However, the output of the further path must then be tailored by a correction network (FIG. 3*a*) which is used in place of the compressor adder resistor R2 shown in FIG. 3; the desired 6 db of boost at low and mid-frequencies, together with a smooth transition to the full 10 db at high frequencies, can then be obtained.

Any further increase in low frequency loop gain by altering the time-constant network in the emitter circuit of the control amplifier is undesirable, since there will then be a tendency for the high frequency transmission of the filter/limiter to be affected unnecessarily by low frequency signals, with the attendant introduction of noise modulation effects.

Another possibility of producing a stronger low and mid-frequency limiting characteristic is to increase the impedance of the low frequency path driving the FET. Referring to FIG. 3, assume that R5 is missing and that R3 is increased to a high value (the filter/limiter output feeding into a very high input impedance amplifier 16). At very low frequencies the FET 17 will then be able to limit the signal strongly even with a modest loop gain. However, at high frequencies R3 is shunted by the series combination of C1 and R4, causing a mid-frequency dip in response, even under low-level conditions with no conduction of the FET.

A method of avoiding the quiescent-conditions dip is shown in FIG. 4. The earthed end of R4 is connected to the output of a high input impedance amplifier 22 with a gain of unity, the input of which is fed from the limiter output. So long as no limiting action occurs, the feedback to R4 substantially prevents conduction therethrough, i.e. R4 appears as a very high impedance whereby C2, R4 has a very low cut-off frequency e.g. 2 Hz.

Under low-level conditions (no FET action) the circuit passes all frequencies with a gain of unity. When the FET 17 begins to conduct, a voltage drop will be developed across R3 and C1, thereby reducing the voltage at the output point 23 and at the lower end of R4; the effective impedance of R4 will the be decreased, which will cause the turnover frequency of C2 and R4 to shift upwards.

If the circuit constants are suitably proportioned it should be possible to create an intentional mid-frequency dip in the overall compressor output under conditions of moderate limiting, which would be in the direction of maintaining the nose reduction action at low frequencies (hum reduction) while reducing the compressor boosting at mid-frequencies.

When the limiting is very great the circuit tends to revert to that of FIG. 3, the bottom end of R4 being essentially at earth potential for low and medium frequencies. The circuit thus has the ideal qualities of providing any desired degree of limiting at low and mid frequencies using a low loop-gain, while retaining a flat frequency response under quiescent conditions.

If desired, a network such as shown in FIG. 3*a* can be used in the adding circuit in place of R2 to proportion the amount of low and mid-frequency noise reduction obtained.

In another modification, R3 is in parallel with C1 only, instead of the series combination of C1 and C2. The further path is still then all-pass at low levels because the effective impedance of R4 is so very high at low levels that C2 and R4 may together give a cut-off frequency as low as, say, 2 Hz.

Even if a network with a mid-band dip is created as suggested above, there will be some interdependence between the amount of low frequency and high frequency noise reduction obtained. A more efficient arrangement, e.g. for disc noise reduction, is given in FIG. 5, which shows a circuit with a further path made up of separate sub-paths 13 and 24 for dealing with high frequency plus mid-band and low frequency plus mid-band noise respectively. To reduce noise modulation effects it is desirable to exclude the extreme opposite portion of the spectrum from each further path, this being achieved by a low frequency rejection filter 25 in the path 13 and a high frequency rejection filter 26 in the path 24. The filters 25 and 26 may, for example, reject frequencies below 100 Hz and above 2 KHz respectively. Networks 27 and 28 can then be added at the outputs of the high frequency and low frequency paths 13 and 24 respectively to result in an overall low-level spectrum which is uniform throughout the spectrum.

The components of the path 24 have largely been given the same references as the path 13 but with an added prime. The contribution of the paths 13 and 24 are added to that of the main, straight-through path 12 through the networks 27 and 28.

In order to deal with the low frequency end of the spectrum the high-pass filter C1, C2, R3, R4 of the path 13 is replaced in the path 24 by two series inductors L1 and L2 with a shunt resistor R6 to which the unity-gain amplifier 22' is connected. (A less satisfactory alternative is to replace L1 and L2 by resistors and to replace R6 by a capacitor.)

FIG. 8 illustrates the operation of FIG. 5. Under quiescent conditions the frequency response of the low frequency path 24 may be represented by curve (a) and that of the high frequency path 13 by curve (b). The uniform overall response of the compressor at low levels is shown in curve (cO). In the presence of a mid-band signal only, paths 13 and 24 become respectively high- and low-pass, giving a characteristic as at (d). If a substantial low frequency component is also present we have curve (e) and similarly, if a substantial high frequency component is present we have curve (f). If both such components are present we have curve (g).

The control circuit amplifiers 18 and 18' have gains which are preferably increased at the low and high frequencies, respectively, which results in improved independence in operation of the two paths, for avoidance of noise modulation effects and also for reducing the possibility of overloading the recording medium.

FIG. 6 shows a simplification of FIG. 5 in which a single further path is used with the low- and high-pass filter sections in parallel. The same independence of action is no longer possible, but the circuit may give satisfactory results in inexpensive noise reduction systems.

It should be mentioned that filter/limiter circuits such as those shown in FIGS. 4, 5 and 6 can be use elsewhere than in type I and II compressors and expanders. Consider any three terminal impedance network with an input terminal, an output terminal connected to an FET as in FIG. 4 and a common terminal connected to the output terminal through a unity gain feedback amplifier, again as in FIG. 4. The quiescent property of the circuit is a gain of unity; the properties of the circuit under FET conduction conditions are determined by the particular three terminal network used, but the possible changes obtainable are greater than those normally associated with a single controllable element. These properties may be useful in conventional high-level limiters, compressors and expanders, in which the signal is fed through a single variable transmission path.

I claim:

1. A circuit arrangement having characteristics for compressing or expanding the dynamic range of an input signal having a predetermined dynamic range including a low-level portion, comprising a main signal path extending between an input point and an output point and responsive to said input signal to provide a main path signal substantially proportional to said input signal, a further path having an input connected to at least one of said input point and said output point, and an output providing a further path output signal, and means for combining said further path output signal with said main path signal so as either to boost or buck said main path signal, said further path including a filter with variable frequency response characteristics for restricting signals passing through said further path, said filter being constructed to present substantially all-pass characteristics when the input signal is in said low-level portion and including a branch of variable impedance whose impedance is so responsive to one or more signals in said circuit arrangement that, at signal levels higher than the levels corresponding to said low-level portion, the filter assumes characteristics for rejecting the signals in at least a portion of the mid-band portion of the frequency band occupied by said input signal.

2. A circuit arrangement according to claim 1, wherein the further path comprises two sub-paths connected in parallel and whose filters are constructed to assume high-pass and low-pass characteristics respectively at the higher signal levels.

3. A circuit arrangement according to claim 1, wherein the filter comprises at least one series branch and at least one parallel branch following said series branch and including a controlled resistance device, and a control circuit responsive to said one or more signals to control said device so as to reduce said resistance as said output rises.

4. A circuit arrangement according to claim 3, wherein the controlled resistance device is a field effect transistor.

5. A circuit arrangement according to claim 3, comprising a direct resistive series connection from the input of the further path to the said parallel branch.

6. A circuit arrangement according to claim 5, wherein the filter consists of a first reactive series branch, followed by a resistive parallel branch, followed by a second reactive series branch, followed by said parallel branch including said controlled resistance device, and a resistor in parallel with the series combination of the two reactive branches.

7. A circuit arrangement according to claim 6, wherein said two reactive branches are capacitive branches.

8. A circuit arrangement according to claim 3, wherein the filter comprises a first series branch, followed by a first parallel branch, followed by a second series branch, followed by said parallel branch including said controlled resistance device, and an amplifier of substantially unity gain connected to feed back the output of the filter to said first parallel branch, whereby the impedance presented by said first parallel branch is substantially increased when the other parallel branch is substantially non-conductive but falls progressively when said other parallel branch becomes progresssively more conductive.

9. A circuit arrangement according to claim 8, wherein the filter includes two sections in parallel and at least one parallel branch connected to the output of said amplifier of substantially unity gain, the two sections being constructed to assume high-pass and low-pass characteristics respectively at the higher signal levels.

10. In a noise reduction system comprising a first circuit arrangement having characteristics for compressing an input signal having a predetermined dynamic range including a low-level portion, and a second circuit arrangement having characteristics for expanding the compressed signal, wherein the circuit arrangements are complementary and each comprise a main signal path extending between an input point and an output point and responsive to said input signal and said compressed signal respectively to provide a corresponding main path signal substantially proportional to said input signal and said compressed signal respectively, a further path having an input connected to at least one of said input point and said output point, and an output providing a further path output signal, and means for combining said further path output signal with the corresponding main path signal, so as to boost and buck said main path signal in said first and second arrangements respectively, said further path of each said circuit arrangement including a filter with variable frequency response characteristics for restricting signals passing through the further path, the improvement wherein:

said filter in each said circuit arrangement is constructed to present substantially all-pass characteristics when said input signal is in said low-level portion and including a branch of variable impedance whose impedance is so responsive to one or more signals in the respective circuit arrangement that, at signal levels higher than the levels in said low-level portion, the filter assumes characteristics for rejecting the signals in at least a portion of the mid-band portion of the frequency band occupied by said input signal.

* * * * *